(12) United States Patent
Kemp

(10) Patent No.: US 7,292,974 B2
(45) Date of Patent: Nov. 6, 2007

(54) METHOD FOR RECOGNIZING SPEECH WITH NOISE-DEPENDENT VARIANCE NORMALIZATION

(75) Inventor: Thomas Kemp, Remseck (DE)

(73) Assignee: Sony Deutschland GmbH, Cologne (DE)

( * ) Notice: Subject to any disclaimer, the term of this patent is extended or adjusted under 35 U.S.C. 154(b) by 972 days.

(21) Appl. No.: 10/066,993

(22) Filed: Feb. 4, 2002

(65) Prior Publication Data

US 2002/0107687 A1  Aug. 8, 2002

(30) Foreign Application Priority Data

Feb. 6, 2001  (EP)  ................... 01102582

(51) Int. Cl.
  *G10L 15/00* (2006.01)
(52) U.S. Cl. .................................... 704/234
(58) Field of Classification Search ................ 704/201, 704/233, 234
  See application file for complete search history.

(56) References Cited

U.S. PATENT DOCUMENTS 5,604,839 A * 2/1997 Acero et al. ................ 704/234
5,712,956 A * 1/1998 Yamada et al. ............. 704/234
6,173,258 B1 * 1/2001 Menendez-Pidal et al. . 704/233
6,308,155 B1 * 10/2001 Kingsbury et al. ...... 704/256.1
6,768,979 B1 * 7/2004 Menendez-Pidal et al. . 704/226

OTHER PUBLICATIONS

Woodland et al: "Improvements in Accuracy and Speed in he HTK Broadcast News Transcription System" Eurospeech'99, vol. 3, Sep. 5-9, 1999, pp. 1043-1046, XP002171361.
Kobatake H et al: "Degraded Word Recognition Based on Segmental Signal-To-Noise Ratio Weighting" Proceedings of the International Conference on Acoustics, Speech, and Signal Processing. (ICASSP), US, New York, IEEE, Apr. 19, 1994, pp. I-425-I-428, XP000529414.
Stolcke et al: "The SRI Mar. 2000 HUB-5 Conversational Speech Transcription System" Nist Speech Transcription Workshop 2000, May 16-19, 2000, XP0002171362.
Ljolje et al: "The AT&T LVCSR-2000 System" Nist Speech Transcription Workshop 2000, May 16-19, 2000, XP002171363.

* cited by examiner

Primary Examiner—Angela A. Armstrong
(74) Attorney, Agent, or Firm—Oblon, Spivak, McClelland, Maier & Neustadt, P.C.

(57) ABSTRACT

As the application of a variance normalization (VN) to a speech signal (S) may be advantageous as well as disadvantageous with respect to the recognition rate in a speech recognizing process in dependence of the degree of the signal disturbance it is suggested to calculate a degree (ND) of variance normalization strength in dependence of the noise level of the signal, thereby skipping the step of variance normalization in the case of an undisturbed or clean signal.

10 Claims, 2 Drawing Sheets

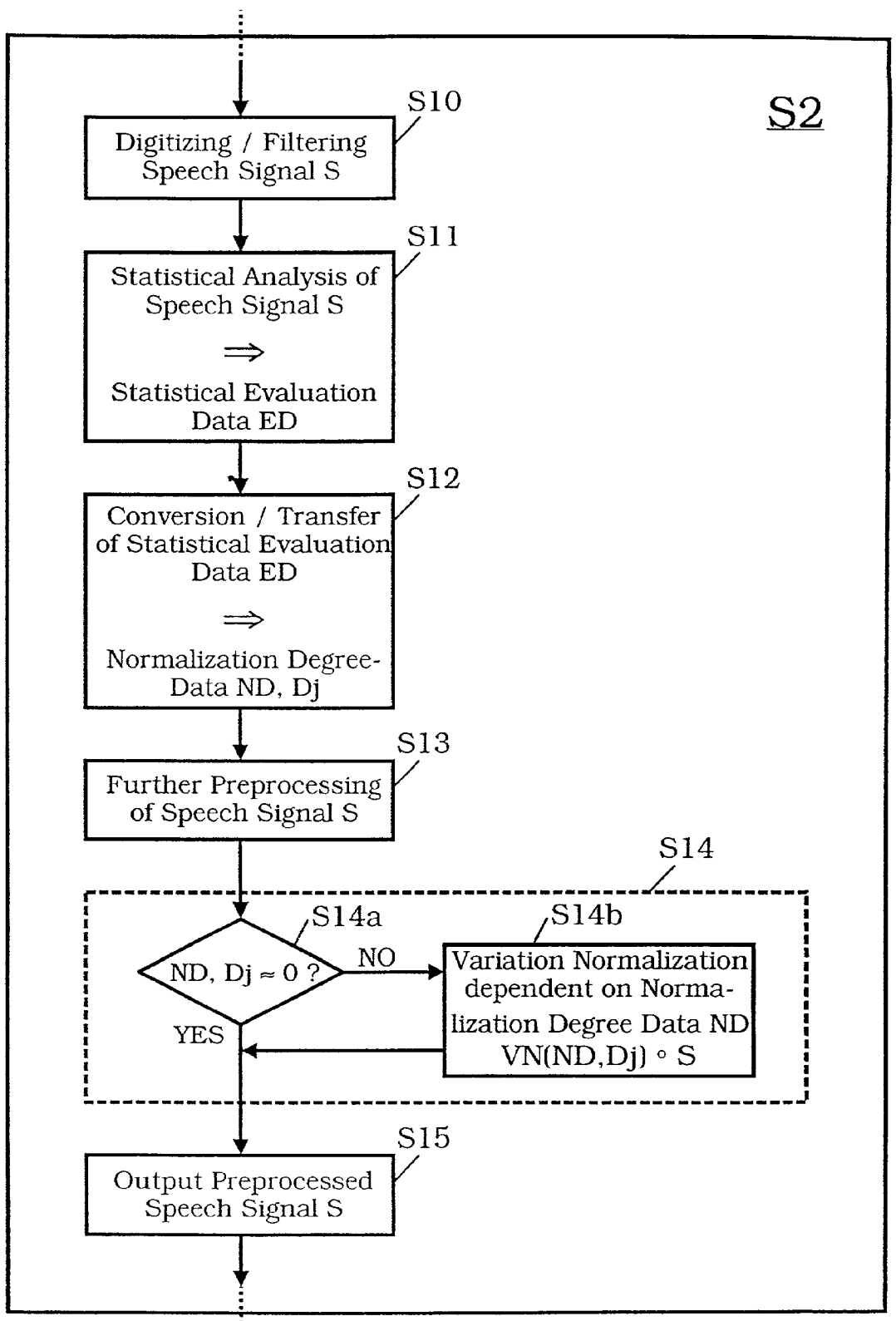

METHOD FOR RECOGNIZING SPEECH WITH NOISE-DEPENDENT VARIANCE NORMALIZATION

BACKGROUND OF THE INVENTION (1) Field of the Invention

The present invention relates to a method for recognizing speech and more particularly to a method for recognizing speech which uses noise-dependent variance normalization.

(2) Description of the Related Art

Methods for recognizing speech can generally be subdivided into the sections of inputting or receiving a speech signal, preprocessing said speech signal, a process of recognition and a section of outputting a recognized result.

Before the step of recognizing a speech signal said speech signal is generally preprocessed. Said preprocessing section comprises for instance a step of digitizing an incoming analogue speech signal, a step of filtering and/or the like.

Additionally, it has been found that including a step of variance normalization of the received speech signal, a derivative and/or a component thereof can in some cases increase the recognition rate in the following recognition section, but not in all cases.

BRIEF SUMMARY OF THE INVENTION

The object is achieved by a method for recognizing speech with the features as set forth in claim 1. Preferred embodiments of the inventive method for recognizing speech are within the scope of the dependent subclaims.

The proposed method for recognizing speech comprises a preprocessing section in which a step of performing variance normalization is applicable to a given or received speech signal, derivative and/or to a component thereof. According to the invention the preprocessing section of the proposed method for recognizing speech comprises a step of performing a statistical analysis of said speech signal, a derivative and/or of a component thereof, thereby generating and/or providing statistical evaluation data. From the so derived statistical evaluation data the inventive method generates and/or provides normalization degree data. Additionally, the inventive method for recognizing speech comprises in its preprocessing section a step of performing a variance normalization on said speech signal, a derivative and/or on a component thereof in accordance with said normalization degree data—in particular with a normalization strength corresponding to said normalization degree data—with normalization degree data having a value or values in the neighborhood of 0 indicating that no variance normalization has to be performed.

It is therefore an essential idea of the present invention not to perform a variance normalization in all cases of received or input speech signals but to decide to what degree a variance normalization has to be carried out on the speech signal, a derivative and/or on a component thereof in dependence on a statistical analysis of said speech signal and/or of said derivative or component thereof. To control the extent of the variance normalization, normalization degree data are derived from said statistical evaluation data coming out from the statistical analysis, wherein normalization degree data being zero or lying in the vicinity of zero implying that no variance normalization has to be performed.

In contrast to prior art methods for recognizing speech employing variance normalization the inventive method for recognizing speech uses a variance normalization, the extent of which is dependent on the quality of the received or input speech signal or the like. By this measure disadvantages of prior art methods can be avoided. Variance normalization is applied to an extent which is advantageous for the recognition rate. Therefore, variance normalization is adapted with respect to the noise level being represented by the statistical evaluation data and being converted into the variance normalization degree data.

Of course, said statistical analysis can be carried out on the speech signal and/or on the derivative or component thereof in its entirety. In some cases it is of particular advantage to perform said statistical analysis in an at least piecewise or partially frequency-dependent manner. For instance the received and/or input speech signal and/or the derivative or component thereof may be subdivided in frequency space in certain frequency intervals. Each frequency component or frequency interval of the speech signal and/or of its derivative or component may independently be subjected to the process of statistical analysis yielding different statistical evaluation data for the different and distinct frequency components or intervals.

The same holds for the generation and provision of statistical evaluation data and/or for the generation and provision of said normalization degree data. They may also be generated and provided for the received and input speech signal and/or for the derivative or component thereof in its entirety. But it may be again of particular advantage to use said frequency decomposition or its decomposition into frequency intervals.

The particular advantage of the above discussed measures lies in the fact that different frequency ranges of the speech signal may be subjected to different noise sources. Therefore, in particular in the case of a non-uniform noise source, different frequency components of the input or received speech signal may have different noise levels and they may therefore be subjected to different degrees to the process of variance normalization.

Said statistical analysis may preferably include a step of determining signal-to-noise ratio data or the like. This may be done again in particular in a frequency-dependent manner.

According to a further preferred embodiment of the inventive method for recognizing speech a set of discrete normalization degree values is used as said normalization degree data. In particular, each of said discrete normalization degree values is assigned to a certain frequency interval, and said frequency intervals may preferably have no overlap.

It is of particular advantage to use discrete normalization degree values which are situated in the interval of 1 and 0. According to another preferred embodiment of the inventive method for recognizing speech a normalization degree value in the neighborhood of 0 and/or being identical to 0 indicates that the process of variance normalization has to be skipped for the respective assigned frequency interval. That means, that the respective speech signal and/or the derivative or component thereof is an almost undisturbed signal for which a variance normalization would be disadvantageous with respect to the following recognition process.

In a similar way it is of particular advantage to assign in each case to a normalization degree value in the neighborhood of 1 a maximum performance of the variance normalization for the respective assigned frequency interval.

For the generation of the normalization degree data from the statistical evaluation data, and in particular for the generation of the normalization degree values, it is preferred to use transfer functions between statistical evaluation data and said normalization degree data or normalization degree values.

These transfer functions may include the class of piecewise continuous, continuous or continuous-differentiable functions or the like, in particular so as to achieve a smooth and/or differentiable transition between said statistical evaluation data and said normalization degree data and/or said normalization degree values.

Preferred examples for said transfer functions are theta-functions, sigmoidal functions, or the like.

A preferred embodiment for carrying out said variance normalization per se is a multiplication of said speech signal and/or of a derivative or component thereof with a so-called reduction factor R which is a function of the signal noise and/or of the normalization degree data or normalization degree values. Again, this may include the frequency dependence with respect to certain frequency values and/or certain frequency intervals.

A particular preferred example for said reduction factor R—which may be again frequency-dependent—is $$R=1/(1+(\sigma-1)\cdot D)$$

with $\sigma$ denoting the temporal standard deviation of the speech signal, its derivative or component, and/or its feature. In this structure D denotes the normalization degree value, which again may also be frequency-dependent.

The features and benefits of the present invention may become more apparent from the following remarks:

In automatic speech recognition the preprocessing step with respect to the input speech data is of crucial importance in order to achieve low word error rates and high robustness against background noise, in particular with respect to the following recognition process.

One particular preprocessing step—the so-called variance normalization—has been found to improve the recognition rate in some cases, but not in all situations.

It is therefore the key idea of the present invention to apply variable levels of variance normalization, the levels being dependent for instance on the amount of background noise found in the speech data.

The invention therefore manages the situation that variance normalization works well when applied to noisy data but deteriorates the recognition rate when applied to undisturbed input data.

The proposed method—and in particular the preprocessing section of the method—may be realized in a two-step procedure with a first step carrying out the determination or measurement of the noise within the input data, in particular of the signal-to-noise ratio (SNR), and the second step comprising the application of a SNR-dependent variance normalization to the input data.

For the first step either external data from for instance a second microphone and/or from knowledge about the application and/or from single-channel estimation methods can be used. The exact way of determining the signal-to-noise ratio does not affect the way and the result of the method. There has been extensive work on the field of SNR-estimation in the past, and any of the known procedures or algorithms in this field might be used in the context of this invention.

The second step, namely the application of SNR-dependent variance normalization—the degree of variance normalization D, which may range from 0 to 1—is determined by employing for instance a transfer function between the SNR-estimate and D. As the optimal analytical form of the transfer function and therefore of D is not yet determined or known, natural choices may be included for said determination, in particular the theta-function which effectively switches variance normalization off in the case of clean or undisturbed data and which switches variance normalization to its maximum for distorted input may be used. Another choice may be the class of sigmoidal function which provides the smooth and differentiable transition or interpolation between the case of no variance normalization and the maximum variance normalization.

The variance normalization itself can easily be computed by dividing the input data by $(1+(\sigma-1)\cdot D)$. $\sigma$ denotes the standard deviation of the input features over time. In contrast, conventional method simply divide the input features by $\sigma$ without taking into account the normalization degree D.

In the proposed method the input data can have an arbitrary representation for example short-time spectral or cepstral parameters. The standard deviation of the input features can be computed in an arbitrary way, for example using the current speech recording. It has been observed that standard variance normalization is more effective if the standard deviation estimate $\sigma$ is computed on more than one utterances of speech from a given speaker. The proposed method is independent from the way of deriving $\sigma$ and hence the method can be used even in the case where $\sigma$ has to be iteratively adapted, whenever new speech is input into the system.

BRIEF DESCRIPTION OF THE DRAWINGS

The invention will now be described in more detail taking reference to accompanying Figures on the basis of preferred embodiments of the inventive method for recognizing speech.

FIG. 2 is a schematical block diagram describing in more detail the preprocessing section of the embodiment of the inventive method shown in FIG. 1.

DETAILED DESCRIPTION OF THE INVENTION

Figure 1:
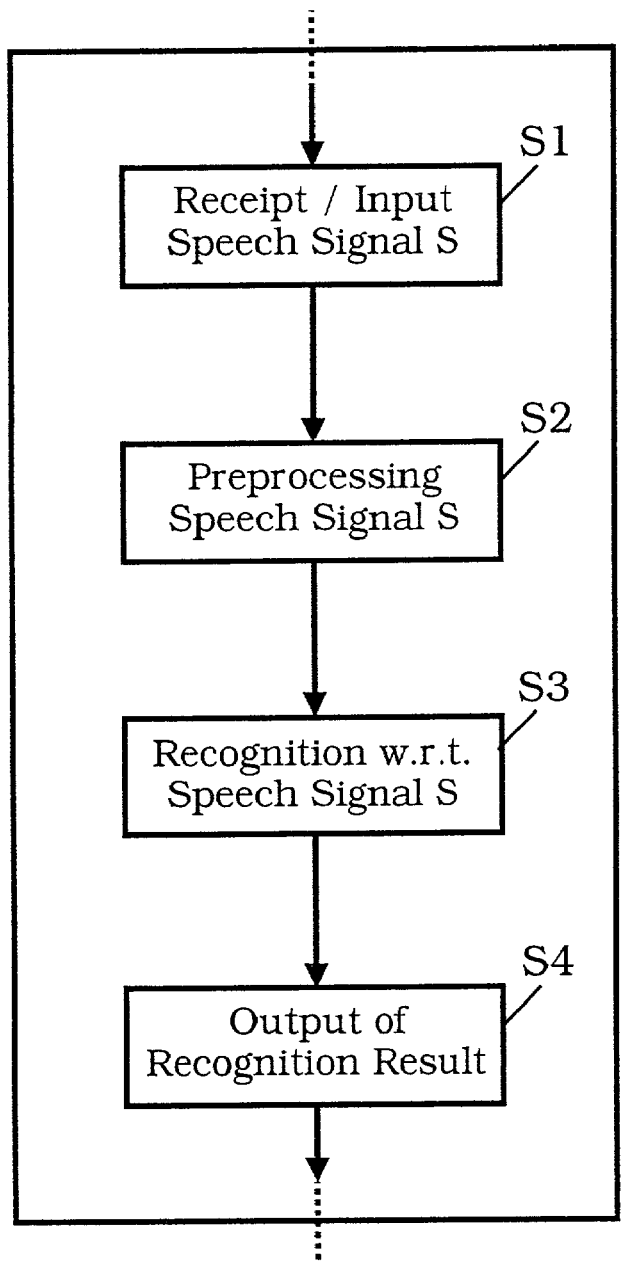
FIG. 1 is a schematical block diagram giving an overview over the inventive method for recognizing speech according to the present invention.

As shown in the schematical block diagram of FIG. 1 the inventive method for recognizing speech is generally composed by a first step S1 of inputting and/or receiving a speech signal S. In the following step S2 said speech signal S and/or derivatives S' or components thereof are preprocessed. In the following step S3 the output of the preprocessing section S2 is subjected to a recognition process S3.

Finally, in the last step S4 the recognition result is output.

The schematical block diagram of FIG. 2 elucidates in more detail the steps of the preprocessing section S2 of the embodiment shown in FIG. 1.

In general, the received or input speech signal S is of analogue form. Therefore, in step S10 of the preprocessing section S2 said analogue speech signal S is digitized.

Following the digitizing step S10 the speech signal S and/or derivatives S' or components thereof are subjected to a statistical evaluation in step S11 so as to provide and generate statistical evaluation data ED.

Based on the so generated statistical evaluation data ED, which may contain a value for the signal-to-noise ratio SNR, normalization degree data ND and/or normalization degree values $D_j$ are derived in step S12 as a function of said statistical evaluation data ED.

Then conventionally, further preprocessing steps may be performed as indicated by section S13.

Finally, in step S14 with substeps 14a and 14b a process of variance normalization VN is applied to said speech signal S and/or to derivatives S' and components thereof. The degree and/or the strength of the variation normalization VN is dependent on and/or a function of the normalization degree data ND and/or of the normalization degree values Dj being generated in step S12. The variance normalization VN is performed in step 14b if according to the condition of step 14a the value or values for said normalization degree data ND, Dj are not in a neighborhood of 0.

The invention claimed is:

1. A method for recognizing speech, comprising:
receiving an input speech signal,
preprocessing said input speech signal in order to thereby generate a preprocessed speech signal,
performing speech recognition with respect to said preprocessed speech signal in order to generate a recognition result, and
outputting said recognition result,
wherein in said preprocessing, a step of performing a variance normalization is applicable to the received speech signal, said preprocessing includes:
performing a statistical analysis of said speech signal, thereby generating and providing statistical evaluation data,
generating a normalization degree data from said statistical evaluation data, and
performing said variance normalization on said speech signal in accordance with said normalization degree data—in particular with a normalization strength corresponding to said normalization degree data, with normalization strength corresponding to said normalization degree data with normalization degree data having a value or values being 0 with respect to a given threshold value indicating that no variance normalization has to be performed,
wherein in each case, a normalization degree value (Dj) being 0 indicates to skip any variance normalization for the respective assigned frequency interval (fj, Δfj).

2. The method according to claim 1,
wherein said statistical analysis is performed in an at least piecewise or partial frequency-dependent manner.

3. The method according to claim 1,
wherein said evaluation data and/or said normalization data are generated so as to reflect at least a piecewise frequency dependency.

4. The method according to claim 1,
wherein said statistical analysis includes a step of determining signal-to-noise ratio data, in particular in a frequency-dependent manner.

5. The method according to claim 1,
wherein a set of discrete normalization degree values (Dj) is used as said normalization degree data, in particular each discrete normalization degree value being assigned to a certain frequency interval (fj, Δfj), and said intervals (fj, Δfj) having essentially no overlap.

6. The method according to claim 5, wherein each of said discrete normalization degree values (Dj) has a value within the interval of 0 and 1.

7. A method for recognizing speech, comprising:
receiving an input speech signal,
preprocessing said input speech signal in order to thereby generate a preprocessed speech signal,
performing speech recognition with respect to said preprocessed speech signal in order to generate a recognition result, and
outputting said recognition result,
wherein in said preprocessing, a step of performing a variance normalization is applicable to the received speech signal, said preprocessing includes:
performing a statistical analysis of said speech signal, thereby generating and providing statistical evaluation data,
generating a normalization degree data from said statistical evaluation data, and
performing said variance normalization on said speech signal in accordance with said normalization degree data —in particular with a normalization strength corresponding to said normalization degree data, with normalization strength corresponding to said normalization degree data with normalization degree data having a value or values being 0 with respect to a given threshold value indicating that no variance normalization has to be performed,
wherein in each case, a normalization degree value (Dj) being 1 with respect to a given threshold value indicates to perform a maximum variance normalization for the respective assigned frequency interval (fj, Δfj).

8. The method according to claim 7,
wherein a transfer function between said statistical evaluation data and said normalization degree data is used for generating said normalization degree data from said statistical evaluation data.

9. The method according to claim 8,
wherein a piecewise continuous, continuous or continuous differentiable function is used as said transfer function, so as to particularly achieve a smooth and/or differentiable transfer between said statistical evaluation data and said normalization degree data.

10. The method according to claim 8,
wherein a theta-function, or a sigmoidal function, is employed as said transfer function.

* * * * *